(12) United States Patent
Patel

(10) Patent No.: US 10,167,667 B2
(45) Date of Patent: Jan. 1, 2019

(54) METHOD FOR PREVENTING FALSE POSITIVE OCCUPANCY SENSOR DETECTIONS CAUSED BY MOTION

(71) Applicant: PHILIPS LIGHTING HOLDING B.V., Eindhoven (NL)

(72) Inventor: Maulin Dahyabhai Patel, Tuckahoe, NY (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 799 days.

(21) Appl. No.: 14/361,410

(22) PCT Filed: Nov. 21, 2012

(86) PCT No.: PCT/IB2012/056582
§ 371 (c)(1),
(2) Date: May 29, 2014

(87) PCT Pub. No.: WO2013/080091
PCT Pub. Date: Jun. 6, 2013

(65) Prior Publication Data
US 2014/0318716 A1    Oct. 30, 2014

Related U.S. Application Data

(60) Provisional application No. 61/565,691, filed on Dec. 1, 2011.

(51) Int. Cl.
*E06B 9/68* (2006.01)
*H05B 37/02* (2006.01)
(Continued)

(52) U.S. Cl.
CPC .................. *E06B 9/68* (2013.01); *E06B 9/32* (2013.01); *H04Q 9/00* (2013.01);
(Continued)

(58) Field of Classification Search
CPC ...... E06B 9/32; E06B 9/68; E06B 2009/6809; E06B 2009/6818
(Continued)

(56) References Cited

U.S. PATENT DOCUMENTS 5,760,558 A * 6/1998 Popat ........................ E06B 9/32
160/168.1 R
7,977,904 B2 * 7/2011 Berman ..................... E06B 9/32
160/5
(Continued)

FOREIGN PATENT DOCUMENTS

JP    0960452 A    3/1997
JP    20069281 A    1/2006
(Continued)

OTHER PUBLICATIONS

Tzempelikos, A. "The Impact of Venetian Blind Geometry and Tilt Angle on View, Direct Light Transmission and Interior Illuminance", Solar Energy, vol. 82, No. 12, pp. 1172-1191.
(Continued)

*Primary Examiner* — Katherine W Mitchell
*Assistant Examiner* — Jeremy C Ramsey

(57) ABSTRACT

A method and corresponding system is disclosed that provides for management of a response to motion detection in a motion-based system. The method includes: determining a schedule of movement of a position and an orientation of a window treatment, wherein a scheduled time of movement of the window treatment is greater than a time-out period of an occupancy sensor and determining at least one of the position of the window treatment and the orientation of the window treatment at a corresponding time of movement wherein the movement is based at least on one of a current time and a next time, and responsive to a detection of
(Continued)

motion, outputting the determined at least one position and orientation at the current time.

12 Claims, 7 Drawing Sheets

(51) Int. Cl.
    *H04Q 9/00*     (2006.01)
    *E06B 9/32*     (2006.01)

(52) U.S. Cl.
    CPC ..... *H05B 37/0218* (2013.01); *H05B 37/0227* (2013.01); *E06B 2009/6818* (2013.01); *H04Q 2209/84* (2013.01); *Y02B 20/44* (2013.01); *Y02B 20/46* (2013.01)

(58) Field of Classification Search
    USPC ..................................... 160/1, 5; 340/539.23
    See application file for complete search history.

(56) References Cited

U.S. PATENT DOCUMENTS

| | | | | |
|---|---|---|---|---|
| 8,761,594 | B1* | 6/2014 | Gross | H04N 5/2256 396/155 |
| 2005/0110416 | A1* | 5/2005 | Veskovic | E06B 9/32 315/149 |
| 2005/0128067 | A1* | 6/2005 | Zakrewski | G08B 29/20 340/511 |
| 2010/0006241 | A1* | 1/2010 | Veskovic | E06B 9/32 160/405 |
| 2011/0029136 | A1* | 2/2011 | Altonen | E06B 9/68 700/275 |
| 2011/0035061 | A1* | 2/2011 | Altonen | E06B 9/68 700/278 |
| 2011/0240232 | A1* | 10/2011 | Kluck | A47H 5/0325 160/5 |
| 2012/0123226 | A1* | 5/2012 | Schwenk | A61B 5/1118 600/301 |
| 2012/0299728 | A1* | 11/2012 | Kirkpatrick | G08B 13/189 340/541 |
| 2014/0318716 | A1* | 10/2014 | Patel | H05B 37/0218 160/1 |
| 2014/0318717 | A1* | 10/2014 | Patel | H05B 37/0218 160/5 |
| 2014/0338844 | A1* | 11/2014 | Diederiks | E06B 9/68 160/5 |
| 2014/0379305 | A1* | 12/2014 | Kumar | G01V 11/00 702/190 |
| 2015/0237703 | A1* | 8/2015 | Patel | H05B 37/0227 315/151 |
| 2015/0256665 | A1* | 9/2015 | Pera | H04L 12/2803 455/420 |
| 2016/0040478 | A1* | 2/2016 | Lundy | G05B 11/01 700/275 |
| 2016/0047164 | A1* | 2/2016 | Lundy | E06B 9/68 160/5 |
| 2016/0127530 | A1* | 5/2016 | Mullet | G06F 3/04847 455/557 |

FOREIGN PATENT DOCUMENTS

| | | |
|---|---|---|
| JP | 2007231613 A | 9/2007 |
| WO | 2011098945 A1 | 8/2011 |

OTHER PUBLICATIONS

Rambosk, Kevin J. "Online False Alarm Awareness Course", 2011.

* cited by examiner

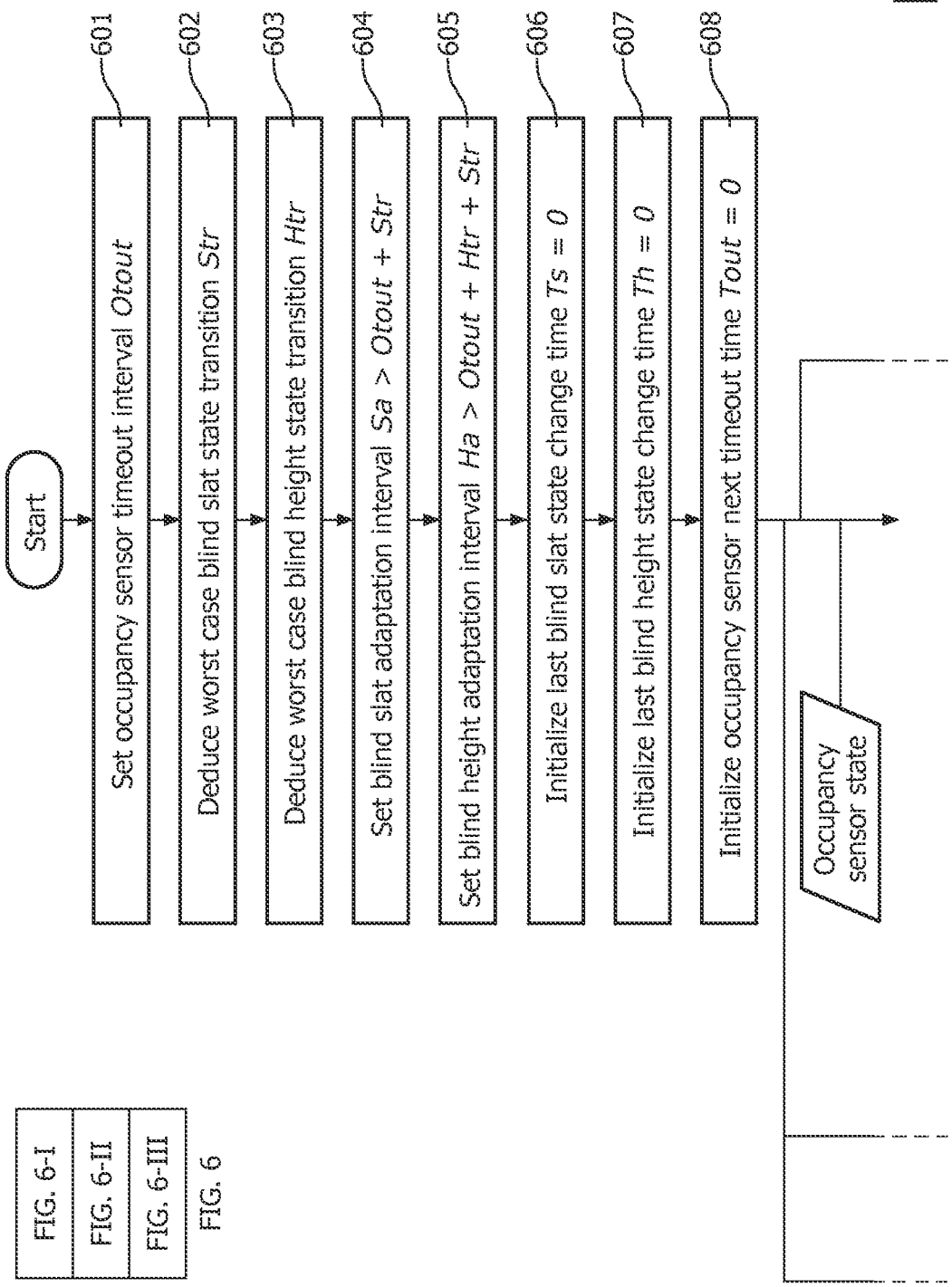
FIG. 6-I

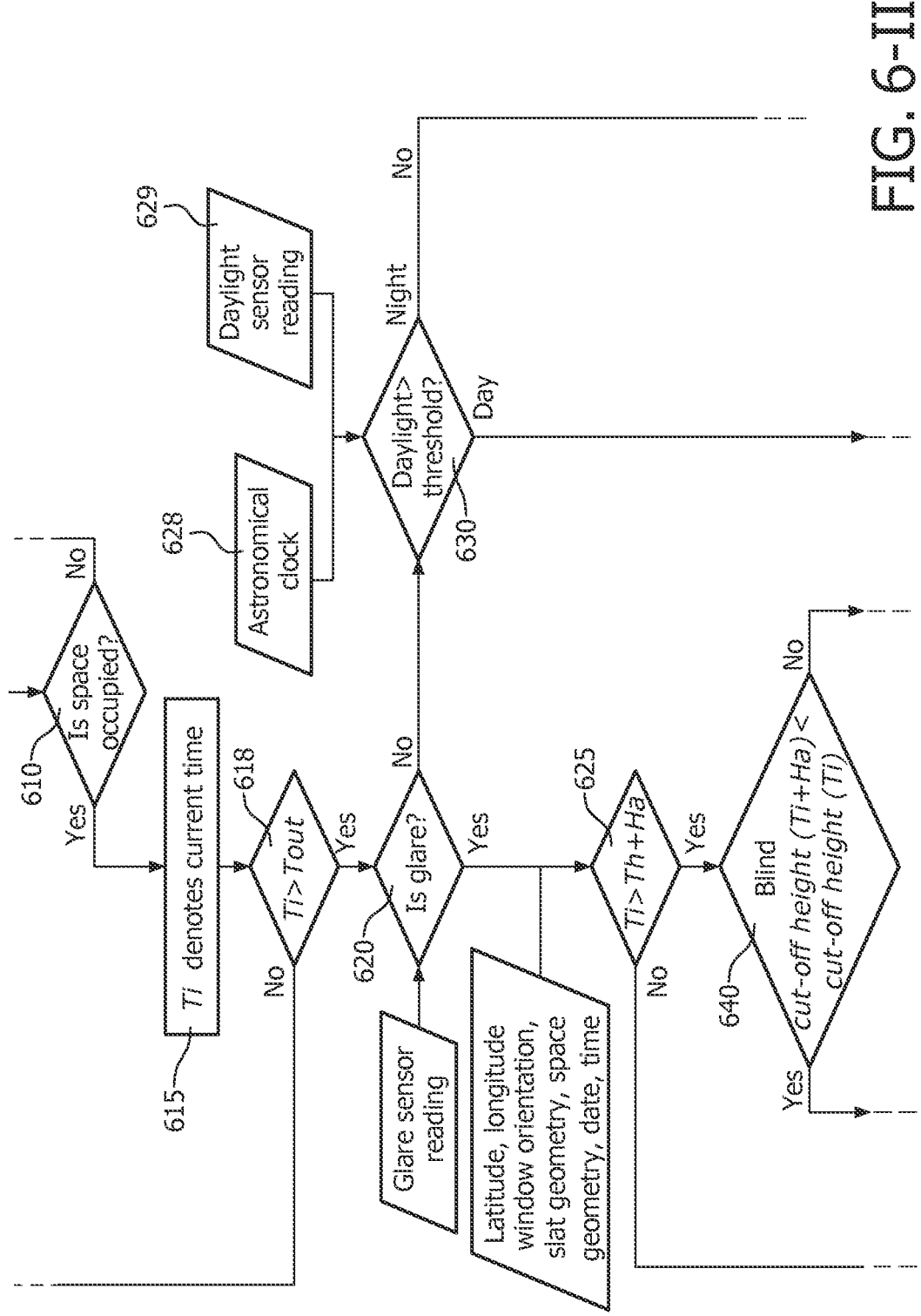
FIG. 6-II

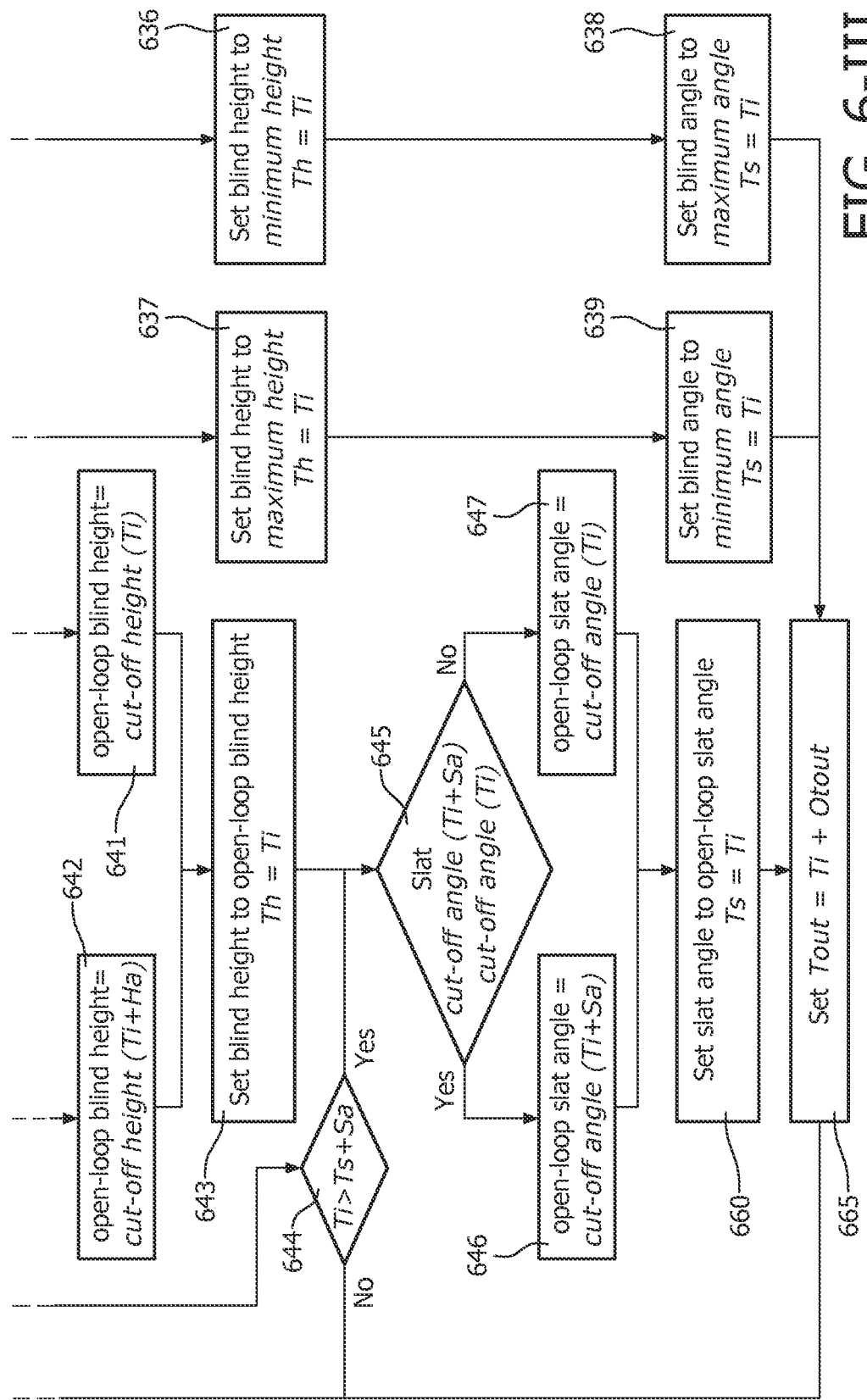
FIG. 6-III

METHOD FOR PREVENTING FALSE POSITIVE OCCUPANCY SENSOR DETECTIONS CAUSED BY MOTION

CROSS-REFERENCE TO PRIOR APPLICATIONS

This application is the U.S. National Phase application under 35 U.S.C. § 371 of International Application No. PCT/IB2012/056582, filed on Nov. 21, 2012, which claims the benefit of U.S. Provisional Patent Application No. 61/565,691, filed on Dec. 1, 2011. These applications are hereby incorporated by reference herein.

This application relates to the field of Light Management System and more particularly a method for improved management of motion sensing in a lighting system.

With the increased emphasis on energy conservation, systems for controlling electrical energy consumed by lighting systems are used to limit the unintended operation of lighting system. Scheduling is one example to limit unintended operation of lighting system wherein the timer controls the energy flow to the lighting system during specified times. Another example is using a photo-electric sensor wherein the lights are turned-on if photo-sensor detects insufficient light and lights are turned off if it detects too much light.

Another example of limiting the unintended operation of lighting systems is to use motion sensors, wherein the flow of electrical energy occurs when motion is detected. Motion sensors, also known as occupancy sensors, are generally used in rooms to limit the use of the lighting system only when the room is occupied. Occupancy sensors may also be coupled with photo-sensors to limit the electrical flow. The photo-sensor may sense the ambient light level in the room and if the light level is above a threshold level, then the lighting system is preventing from being activated even if motion is sensed.

While these systems are useful in controlling the lighting system, then do not consider other factors that may contribute to energy consumption. For example, if the window blinds or shades are drawn (closed) a photo-sense occupancy sensor, may activate the lighting system when motion is detected and the ambient light level is too low. However, just opening the blinds or shades to increase the ambient level may not be practical as the opened blinds may allow sunlight to enter the room. Depending on the direction of the window and the angle of sun, the added sun light may cause the discomfort to the occupant due to glare.

To overcome the unintended consequence of only managing one aspect of energy consumption, integrated lighting and shading systems have been developed. For example, a Hybrid Integrated Lighting and Daylight Control (ILDC) system comprising of Philips sensors, lights, dimming ballasts, networking infrastructure incorporating motorized blinds has been developed. A key differentiator between a Hybrid ILDC and the other light management systems is the ability of the Hybrid ILDC system to opportunistically integrate daylight with artificial light without causing discomfort associated with bright windows and dull interiors.

A fundamental problem observed during ILDC operation is that the window treatment (i.e., window covering) movement triggers the occupancy sensors to believe that the room is occupied. The false positive occupancy detection, due to blind movement, turns lights on and/or keeps the lights on, thereby wasting significant amount of energy.

Hence, there is a need in the industry for a method of coordinating the blind movement to avoid detection by the occupancy sensor.

The present invention has been made to provide for integrated control of a lighting system and a motorized window covering/window treatment system that reduces the false positive indication and, thus, reduce energy consumption.

For example, window coverings or treatments may be well-known Venetian blinds, where the blinds may be raised to expose the enclosed area to the outside environment or lowered to prevent exposure of the enclosed area to the outside environment. Similarly, the angle of the blinds may be set to allow discreet amount of light to enter the enclosed area. Other types of window coverings may be vertical blinds that operation similar to Venetian blinds moved in a horizontal direction and the angle of the blinds is with respect to a vertical axis. Additionally, Roman window treatments operate to allow selected areas of the treatment to open or close. Roller shades are also used to cover the window for glare mitigation, solar heat gain reduction and daylight regulation. Other types of window treatments and coverings are known and considered in the scope of the invention claimed.

In one aspect of the invention, a system for management of a response to motion detection in a motion-based system is disclosed. The system comprises, at least one occupancy sensor distributed about an enclosed area, said at least one occupancy sensor detecting motion within the enclosed area; a window treatment system having at least one means for controlling at least one of: a position and an orientation of the window treatment system; and a processor in communication with a memory, the memory including code which when accessed by the processor causes the processor to: determine a schedule of movement of each of the window treatment position and the window treatment orientation, wherein a scheduled time of movement of the window treatment is greater than a time-out period of the at least one occupancy sensor; determining at least one of a position of the window treatment and an orientation of the window treatment at a corresponding time of movement wherein the movement is based on at one of: a current time and a next time; and outputting the selected at least one position and orientation at the current time.

The above and other exemplary features, aspects, and advantages of the present invention will be more apparent from the following detailed description taken in conjunction with the accompanying drawings, in which.

Figure 3A:
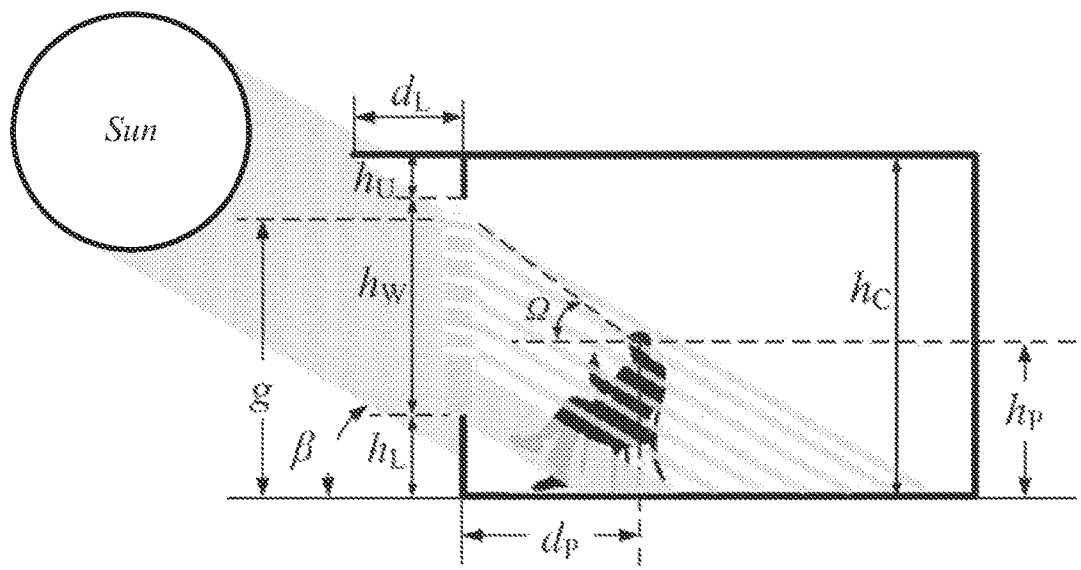
Figure 3B:
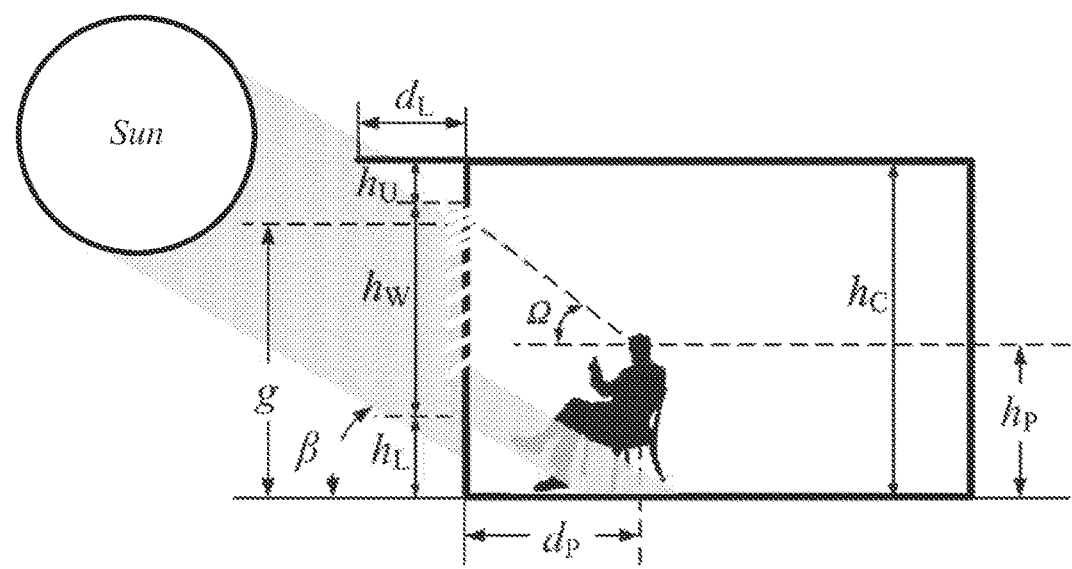

FIGS. 3(a) and 3(b) illustrate an exemplary configuration illustrating factors used is determining lighting and blind settings.

Figure 4:
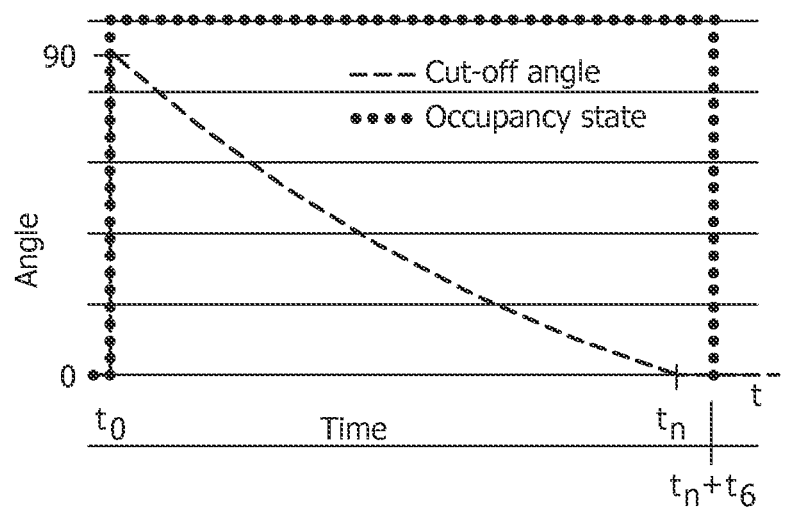

FIG. 4 illustrates a graph of orientation cut-off angle with respect to the time of day according to the conventional integrated lighting and blind system.

Figure 5:
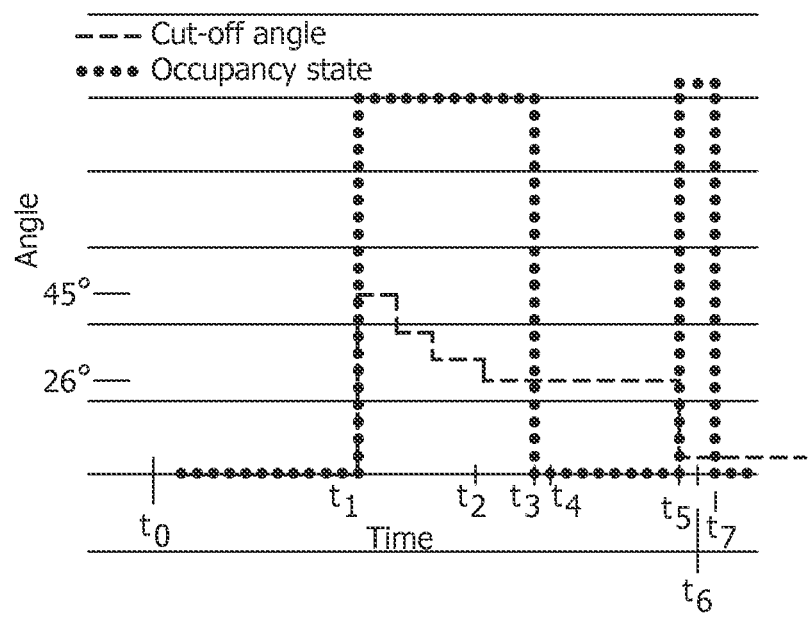

FIG. 5 illustrates a graph of orientation cut-off angle with respect to the time of day in accordance with the principles of the present invention.

FIG. 6 illustrates a flow chart of a process in accordance with the principles of the invention.

Figure 7:
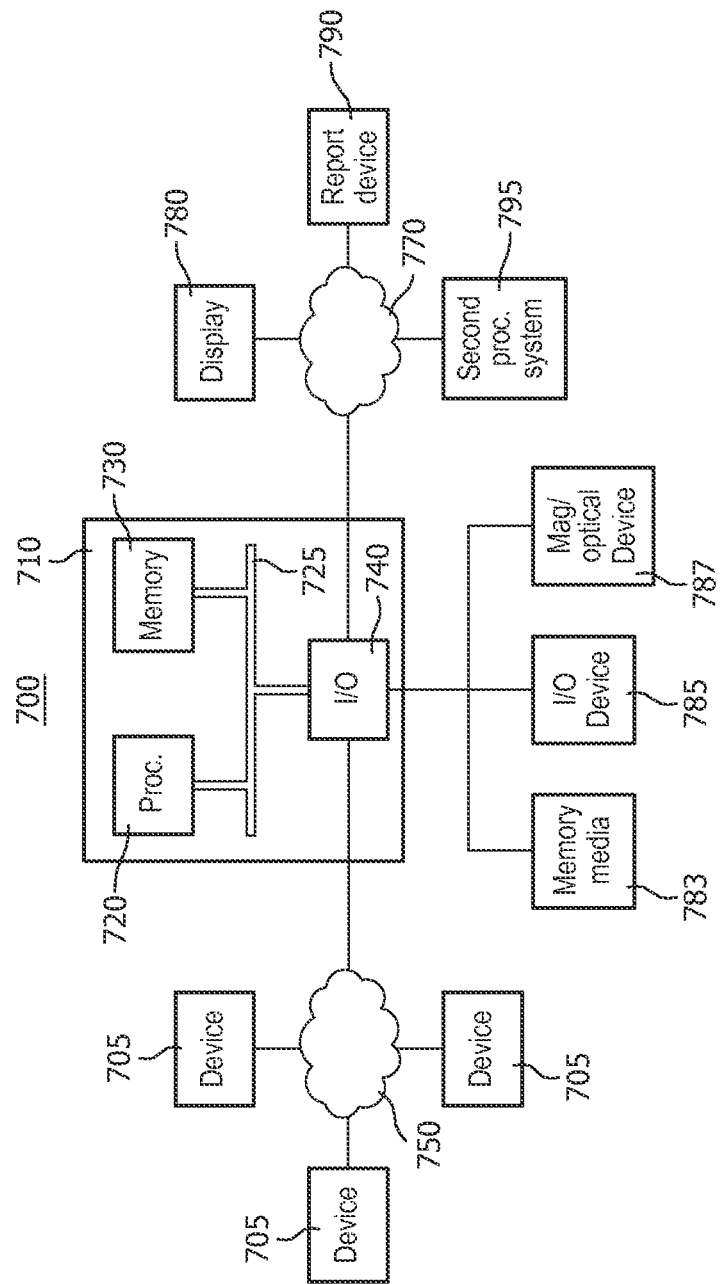

FIG. 7 illustrates an exemplary system for implementing the processing shown herein.

It is to be understood that these drawings are solely for purposes of illustrating the concepts of the invention and are not intended as a definition of the limits of the invention. It will be appreciated that the same reference numerals, possibly supplemented with reference characters, where appropriate, have been used throughout to identify corresponding parts.

Existing lighting control and shading systems typically operate independently, thereby leading to sub-optimal energy efficiency and causing inconvenience to users. Integrated control of artificial lights and motorized blinds provides for optimal use of natural light and artificial light while enhancing user comfort and productivity.

Figure 1:
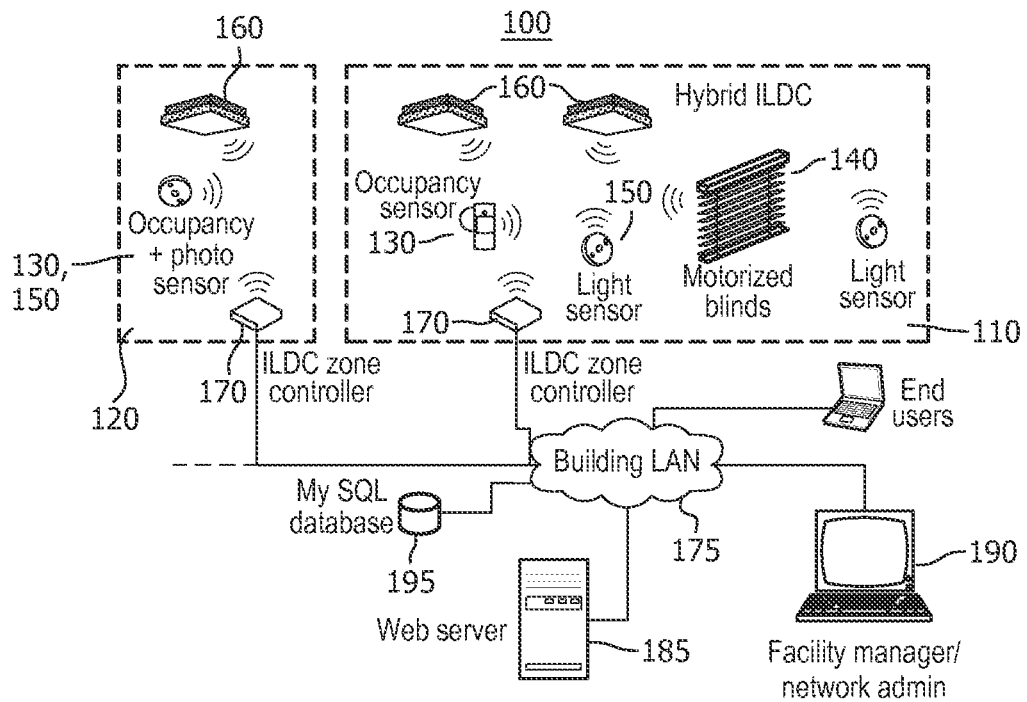
FIG. 1 illustrates a conventional integrated lighting and window covering system.

FIG. 1 illustrates a conventional integrated ILDC system 100 wherein, each user's workstation or area is associated with corresponding sensors, window blinds and fixtures to enable personalized integrated control. The system combines user preferences with sensor readings (occupancy and light level) to harvest natural light through integrated control of motorized blinds and electric light.

Each workstation or area 110, 120 may incorporate motion sensors 130 and/or motorized blinds 140. In addition, light sensors 150 may be included, which monitor ambient light levels.

The motion sensors (occupancy sensors) 130 detect motion, as previously described, activate the lights 160. In addition, blinds 140 are capable of receiving commands to control the height of the blind and the angle of the blind with respect to a horizontal axis.

Each workstation or area further includes control sensors 170 that monitor the corresponding workstation and provide control signals to at least the motorized blinds.

The control sensors 170 are in communication, via a network 175, to a centralized control system 180 that maybe represented by server 185 and computer 190. The information obtained from the control units 170 may further be stored on permanent storage medium 195.

Figure 2:
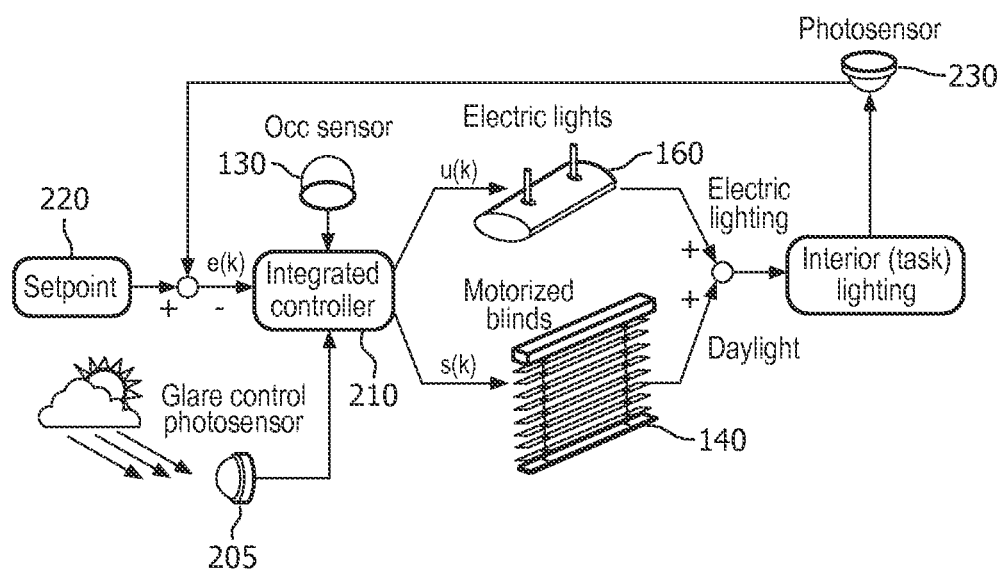
FIG. 2 illustrates a schematic of conventional integrated lighting and window covering system.

FIG. 2 illustrates in further detail the integrated aspect of the ILDC system. In this case, occupational (occupancy) sensor 130 and glare control photo sensor 205 provide signals to integrated controller 210. The occupancy sensor 130, as discussed, provides a signal when motion is detected. The glare control photo sensor provides signals with regard to a level of glare or sunlight that is entering the workspace. Setpoint 220 provides a reference point against which the photo-sensor 230 output is compared. The deviation from setpoint 220 is deduced to derive the amount of artificial light from lighting system 160 that is needed, in combination with natural light, to satisfy the overall illumination needs of the user. That is artificial lights are regulated using occupancy sensor 130 and light sensors 150 and/or photosensor 230. The artificial lights are turned OFF when the space is vacant. When the space is occupied, blinds 140 are open to allow in daylight to an extent that the daylight does not cause discomfort (glare). The artificial light is dimmed so that the combination of artificial light and natural light meets the user's requirement.

The integrated controller 210 receives inputs from the setpoint 220, the occupancy sensor 130, photosensor 230 and the glare control sensor 205 to determine settings for the amount of artificial light and amount of natural light by adjusting the window covering (e.g., slat cutoff angle, window covering height, etc.). The photo sensor 230 monitors the level of light in the workspace and provides this information, as a feedback, to the integrated controller 210.

In determining the positions of the blinds, an open-loop blind height and slat angle control algorithm is implemented in ILDC system. The algorithm adapts blind height and slat angle periodically to avoid glare and enable daylight harvesting. A "cut-off angle" and "cut-off height" are calculated based factors such as latitude, longitude, orientation of window, date, local time and slat geometry. An example of the algorithm for computing the cut-off angle (defined as the angle beyond which no direct radiation is being transmitted through the slats) for blind slats may be found in "The Impact of Venetian Blind Geometry and Tilt Angle on View, Direct Light Transmission and Interior Illuminance," A. Tzempelikos, Solar Energy, vol. 82, no. 12, pp. 1172-1191, December 2008, the contents of which are incorporated by reference, herein.

FIGS. 3(a) and 3(b) illustrate examples of the adjustment of the cut-off angle and cut-off height, wherein the cut-off angle and the cut-off height are based on factors such as sun angle ($\beta$), height of window from the ground ($h_l$), distance of any overhang ($d_L$), height of the window ($h_w$) and the distance of the user from the wall containing the window allowing the sun to enter.

Table 1 presents exemplary values associated with information regarding the location of the blind being controlled.

TABLE 1

A variable list of solar angles

| | |
|---|---|
| L | Local latitude |
| LL | Local longitude |
| $\gamma$ | Facing direction of the room |
| LST | Local standard time |
| AST | Apparent solar time |
| SL | Standard longitude |
| N | The day of a year |
| ET | Equation of time |
| DS | Daylight saving |
| h | Hour angle |
| $\delta$ | Solar declination angle |
| $\alpha$ | Solar altitude angle |
| z | Solar azimuth angle |
| $z_S$ | Surface solar azimuth |
| $\beta$ | Solar profile angle |

Table 2 presents additional information used in determining blind control:

TABLE 2

A list of variables for the blind height control

| | |
|---|---|
| $h_C$ | the height from the ceiling to the floor |
| $h_D$ | the height from the workplane desk surface to the floor |
| $h_U$ | the height from the ceiling to the upper frame of the window |
| $h_W$ | the height of the window |
| $h_L$ | the height from the lower frame of the window to the floor |
| $d_L$ | the width of overhang |
| $d_W$ | the thickness of the wall containing the window |

As would be appreciated, FIGS. 3(a) and 3(b) may, for example, represent an east facing window or a west facing window. In the former case (east facing), the blinds may be adjusted based on a rising sun. In the latter case, the blinds may be adjusted based on a setting sum. In FIG. 3(a), the blind slat-angle 305 remains in a position that allows the sun light to enter the room and is directed toward the user, as indicated by the partial shading of the person sitting by the window. In FIG. 3(b), the blind slats are set to cut-off angle 315 to block the sun from causing discomfort to the user, as indicated by the fully shading of the person sitting by the window.

FIG. 4 is an example of the cut-angle variation as a function of the time of the day, with regard to a South-East facing window blind within a building located at latitude=35.2628 degrees and longitude=−116.6944 degrees and with a Window orientation=133 degrees. In this case, the following convention to specify window orientation: North 0 degree, East 90 degrees, South 180 degrees and West is 270 degrees.

In this example, the cut-off angle is initially at zero degrees for a night time condition (i.e. slats are flat) and occupancy sensor indicates in unoccupied state. The cut-off angle is set to 90 degrees at dawn $t_0$ to block direct sun on an east facing window. That is, based on the cut-off angle algorithm the cut-off angle is determined to be ninety (90) degrees based on the time of day, the direction of the window and other factors as previously described.

However, in this case the room is still unoccupied, but the blind motion triggers the occupancy sensor to indicate motion in the room. The detected motion causes the room to be considered as being an occupied state at $t_0$. The triggering of the occupancy sensor further causes the lights to be turned-on.

As further illustrated, the blind slat cut-off angle decreases as the sun rises and the cut-off angle reaches zeros degrees at $t_n$.

As an example, assume that the cut-off angle changes approximately every 4 minutes (a predetermined time for adjusting or causing movement of the blinds). Since the occupancy sensor timeout interval is 10 minutes, the occupancy sensor remains in occupied state until $t_n$+10 minutes. In this scenario, the occupancy sensor remains in a false positive occupied state due to cut-off angle adaptations for about 3.5 hours during which lights are left ON.

As the blind height and cut-off angle are adapted throughout the day to regulate daylight and avoid glare, the false triggering of occupancy sensors can persist during the whole time. At night, the blinds could be adjusted for privacy/security reasons and/or to minimize heat gain/loss. Therefore, the false triggering of occupancy sensors due to blind movement can lead to enormous lighting energy wastage.

The following solution addresses the problem of false triggering of occupancy sensors due to bind motion.

The blind adaptation algorithm is revised as follows.

Condition 1): Adjust the blinds (height and/or angle) only if the space is currently occupied.

Condition 2): Blind adaptation interval>(occupancy sensor timeout interval+maximum blind (height and/or angle) state transition interval)

Above are necessary and sufficient conditions to guarantee that no more than one false positive occupancy trigger can occur due to blind motion.

Occupancy sensor timeout interval, blind adaptation interval and the maximum blind state transition time can be set at the time of system commissioning.

However, longer blind adaptation time interval may introduce other types of problems.

For example, consider a West facing window that experiences glare during evening hours. In this case the blind slats would be gradually closed to block direct sun from discomforting the occupant. Since cut-off angle is calculated based on current time and the slat cut-off angle is adjusted intermittently, the occupant could be exposed to glare conditions between two successive blind angle adjustments. To mitigate glare in such scenarios, the invention has been made to anticipate a next position of the cut-off angle.

Note that for a given window covering configuration, the latitude, longitude and orientation of the widow, geometric properties of the blind/shade and geometric properties of the space remain constant. The cut-off height and cut-off angle for the blind varies based on the time of the year. If setting the cut-off angle based on a current time could expose the occupant to glare then the cut-off angle is set based on a future time (i.e. the time of next blind adaptation step). By advancing the cut-off angle computation by the blind adaptation interval the occupant is not exposed to glare between current time and time of next blind adaptation step.

In accordance with the principles of the invention, the blind height/slat angle is adjusted to avoid direct sun hitting the occupant. Since blind cut-off height is calculated based on a current time and it is adjusted intermittently the occupant could be exposed to glare conditions between two successive blind height adaptations. For example, when blinds are being gradually deployed to prevent glare (e.g. in a West facing window), the occupant could be exposed to glare between two successive blind height adjustments. To mitigate glare in such scenarios, algorithm is adjusted to determine a blind height (or orientation) at each of a current time and a next time and then blind height (or orientation) at the current time is selected based on the blind height (or orientation) determined at a current time or the blind height (or orientation) at the next time in order to prevent glare to the user.

For example, if setting the cut-off height (or orientation) based on the current time could expose the occupant to glare then the cut-off height (or orientation) is based on a next (future) time (i.e. the time of next blind adaptation step). By advancing the cut-off height (or orientation) computation by the blind adaptation interval the occupant is not exposed to glare between the current time and the time to a next blind adaptation step.

Here, we assume that blind height is zero (0) when blind is fully deployed (e.g. fully lowered down) and blind height is one (1) when blind is fully retracted (i.e. fully raised up).

FIG. 5 illustrates a resulting cut-off angle variation graph after the implementation of a preferred embodiment in accordance with the principles of the invention. In this illustrated example, the occupancy sensor timeout interval is set to 10 minutes and a maximum blind state transition time is 1 minute. In this example, the slat cut-off angle is in an initial state of zero degrees (i.e., a night setting wherein the slats are flat or horizontal) and the occupancy sensor indicates that the space is unoccupied at time $t_0$.

At $t_1$ the occupant walks into the space which triggers the occupancy sensor hence; the slats are set to 45° cut-off angle as determined by the cut-off angle computation algorithm discussed earlier. That is, the occurrence of motion (room occupation) causes the blind cut-off angle to be adjusted based on the time of day and other factors (i.e., the latitude, longitude, and orientation of the window and geometric properties of the blinds and space, etc., as previously discussed). Since the motion is detected by the occupancy or motion sensors, the motion provides an indication of user occupancy, which in turn causes the window treatment to be set to a desired position, and orientation. Note that according to the principles of the invention the blind height/angle is adjusted only when space is occupied.

In this illustrative example of the invention, the cut-off angle is adjusted every 15 minutes (15 minutes>(10 minutes timeout interval+1 minute max blind adaptation interval)) when the space is occupied (as indicated by the occupancy sensor). The occupant walks out of the space at time $t_2$. Since the cut-off angle was last updated at $t_2$ (to 26°) the next update of cut-off angle was scheduled for $t_4$ ($t_2$+12). However, the occupancy sensor timeout countdown expired at $t_3$ ($t_2$+10) which prevented the scheduled cut-off angle adjustment from being executed at $t_4$ ($t_2$+12).

Recall that slats are adjusted only when motion sensor indicates that the space is occupied.

Thus, the slat angle remains at 26° until the occupants walks into the space at $t_5$ upon which the cut-off angle is set to 6°. The occupant walks out of the space at $t_6$ which leads to occupancy sensor timeout at $t_7$ ($t_6$+10). Hence, the slat angle remains at 6° for the rest of the plot.

In this scenario if the space becomes unoccupied then the occupancy sensor timeouts in at least 10 minutes if the window treatments do not move within the 10 minute timeout window.

FIG. 6 illustrates an exemplary process for motion detection management in accordance with the principles of the invention. As would be recognized, the process shown in FIG. 6 is one associated with a Venetian blind window covering system. However, the same processing may be easily adapted for application with Vertical blind, Roman blind and roller shade systems.

With reference to FIG. 6, at blocks 601-608 initial conditions are established with regard to occupancy sensor, worst case blind slat transition interval, worst case blind height transition interval, blind slat adaptation interval, blind height adaptation interval, last blind slat state change time, last blind height state change time and next occupancy sensor timeout time. For example, at block 604, the blind slat adaption interval is set as being greater than the occupancy sensor time out interval ($O_{tout}$) plus the worst case blind slat state transition interval ($S_{tr}$). Similarly, at block 605, the blind height adaption interval is set to be greater than the occupancy sensor time out interval ($O_{tout}$) and the worst case blind height state transition interval ($H_{tr}$).

A determination is made at block 610 whether the space is occupied. If the space is not occupied, then according to the principles of the invention, processing maintains the current position of the blind height and slat angle.

However, when the space is occupied, then a determination is made whether the current time is greater than the occupancy sensor's scheduled timeout time (618). If the current time is not greater than the occupancy sensor's scheduled timeout time then the execution returns to block 610 to determine when the space is occupied. Otherwise, a determination is made whether glare exists in the room, at block 620. This may be determined based on the position of the sun, time of day, location, and current slat cut-off angle or a glare sensor. If glare is determined not to exist, a determination is made, at block 630, whether the daylight is above a threshold level. This may be accomplished by a daylight sensor (629) and/or an astronomical clock (628). If the daylight is not above a threshold level, then the height and slat angle are set to minimum and maximum values respectively, blocks 636, 638. However, if the day light is above the threshold level then the blind height and slat angle are set to maximum and minimum values, respectively, blocks 637, 639. The last slat state change time and last blind height state change time are updated accordingly. Then execution moves to block 665 where the occupancy sensor's next timeout time is updated by adding the occupancy sensor's timeout interval to current time. (Tout=Ti+Otout). Then the execution returns to block 610.

However, if at block 620, it is determined that glare exists, then a determination is made at block 625 whether a current time is greater than the last blind state change time plus the blind height adaptation interval. If not, then no further height adjustment is made and execution moves to block 644.

However, if a current time is greater than the last blind height change time plus the blind height adaptation interval then a determination is made whether the blind cut-off height at a current time plus a height adaptation interval is less than a cut-off height at a current time at block 640. If the cut-off height at a current time plus a height adaption interval is less than the cut-off height at the current time, then the blind height is set to the cut-off height at the current time plus a height adaption interval (i.e., a next time) (block 642, 643). Otherwise, the blind height is set to the cut-off height at the current time (block 641, 643). After setting the blind height and updating the last blind height state change time to current time at block 643 the execution moves to block 645.

Similarly, a determination is made at block 644 whether the current time is greater than the last slat state change time plus the slat adaptation interval at block 644. If block 644 evaluates as false then the execution moves back to block 610. If block 644 evaluates as true then at block 645 a determination is made whether the absolute value of slat cut-off angle at a current time plus a slat cut-off angle adaptation interval is greater than the absolute value of slat cut-off angle at a current time. If the determination is that the absolute value of slat cut-off angle at a current time plus a slat cut-off angle adaptation interval is greater than the absolute value of slat cut-off angle at a current time, then the slat cut-off angle is set as the cut-off angle at the current time plus the slat adaptation interval (646, 660). Otherwise, the slat cut-off angle is set to the cut-off angle at the current time. The blind slat angle is set and the last slat angle state change time is updated to current time at block 660. Then the execution moves to block 665 where occupancy sensor's next timeout time is updated by adding the occupancy sensor's timeout interval to current time. (Tout=Ti+Otout). Then the execution returns to block 610.

The proposed solution addresses false positive versus false negative tradeoffs as discussed below. In practice, a space (area) can be covered by multiple occupancy sensors. Moreover, a user occupying a space can be linked to multiple occupancy sensors to improve the fidelity of detection. Typically, the occupancy sensors close to the window suffer from false positive triggers due to blind movements whereas those which are away from the window do not suffer from false positive triggers caused by blind motion. Thus, the occupancy sensors which are triggered by blind movement (i.e., sensitive to motion) can have shorter occupancy timeout intervals and the occupancy sensors which are not affected by or not sensitive blind movements can have longer timeout interval. This mitigates false negative issue caused by shorter timeout intervals and enables shorter blind adaptation interval without compromising overall occupancy detection fidelity.

FIG. 7 illustrates a system 700 for implementing the principles of the invention as depicted in the exemplary processing shown herein. In this exemplary system embodiment 700, input data is received from sources 705 over network 750 and is processed in accordance with one or more programs, either software or firmware, executed by processing system 710. The results of processing system 710 may then be transmitted over network 770 for viewing on display 780, reporting device 790 and/or a second processing system 795.

Processing system 710 includes one or more input/output devices 740 that receive data from the illustrated sources or devices 705 over network 750. The received data is then applied to processor 720, which is in communication with input/output device 740 and memory 730. Input/output devices 740, processor 720 and memory 730 may communicate over a communication medium 725. Communication medium 725 may represent a communication network, e.g., ISA, PCI, PCMCIA bus, one or more internal connections of a circuit, circuit card or other device, as well as portions and combinations of these and other communication media.

Processing system 710 and/or processor 720 may be representative of a handheld calculator, special purpose or general purpose processing system, desktop computer, laptop computer, palm computer, or personal digital assistant (PDA) device, etc., as well as portions or combinations of these and other devices that can perform the operations illustrated.

Processor 720 may be a central processing unit (CPU) or dedicated hardware/software, such as a PAL, ASIC, FGPA, operable to execute computer instruction code or a combination of code and logical operations. In one embodiment, processor 720 may include code which, when executed by the processor, performs the operations illustrated herein. The code may be contained in memory 730, may be read or downloaded from a memory medium such as a CD-ROM or floppy disk, represented as 783, may be provided by a manual input device 785, such as a keyboard or a keypad entry, or may be read from a magnetic or optical medium (not shown) or via a second I/O device 787 when needed. Information items provided by devices 783, 785, 787 may be accessible to processor 720 through input/output device 740, as shown. Further, the data received by input/output device 740 may be immediately accessible by processor 720 or may be stored in memory 730. Processor 720 may further provide the results of the processing to display 780, recording device 790 or a second processing unit 795.

As one skilled in the art would recognize, the terms processor, processing system, computer or computer system may represent one or more processing units in communication with one or more memory units and other devices, e.g., peripherals, connected electronically to and communicating with the at least one processing unit. Furthermore, the devices illustrated may be electronically connected to the one or more processing units via internal busses, e.g., serial, parallel, ISA bus, microchannel bus, PCI bus, PCMCIA bus, USB, etc., or one or more internal connections of a circuit, circuit card or other device, as well as portions and combinations of these and other communication media, or an external network, e.g., the Internet and Intranet. In other embodiments, hardware circuitry may be used in place of, or in combination with, software instructions to implement the invention. For example, the elements illustrated herein may also be implemented as discrete hardware elements or may be integrated into a single unit.

As would be understood, the operations illustrated may be performed sequentially or in parallel using different processors to determine specific values.

Processing system 710 may also be in two-way communication with each of the sources 705. Processing system 710 may further receive or transmit data over one or more network connections from a server or servers over, e.g., a global computer communications network such as the Internet, Intranet, a wide area network (WAN), a metropolitan area network (MAN), a local area network (LAN), a terrestrial broadcast system, a cable network, a satellite network, a wireless network, or a telephone network (POTS), as well as portions or combinations of these and other types of networks. As will be appreciated, networks 750 and 770 may also be internal networks or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated. For example, any numerical values presented herein are considered only exemplary and are presented to provide examples of the subject matter claimed as the invention. Hence, the invention, as recited in the appended claims, is not limited by the numerical examples provided herein.

What is claimed is:

1. A system for management of a response to motion detection and a window treatment system, the system comprising:
    at least one occupancy sensor, said at least one occupancy sensor detecting motion within an area;
    the window treatment system having a controller for adapting a window treatment state being at least one of a position or an orientation of the window treatment system; and
    a processor in communication with a memory, the memory including code which when accessed by the processor causes the processor to:
    determine a schedule including times for adapting the window treatment state, wherein an adaptation interval time between sequential times in the schedule is greater than a time-out time of the at least one occupancy sensor,
    determine a window treatment state for a corresponding time in the schedule,
    receive an occupancy signal from the at least one occupancy sensor to use in determining occupancy within the area, and
    adapt the window treatment state to the determined window treatment state only if the occupancy signal indicates that the area is occupied.

2. The system of claim 1, wherein the at least one of position and orientation of the window treatment system is based on a geographic location, a geographic orientation of the window treatment system, a time of day, day of the year, geometric properties of the window treatment system and geometric properties of the area.

3. The system of claim 1, wherein said controller of the window treatment system is activated when motion is detected by the at least one occupancy sensor.

4. The system of claim 1, wherein the time-out time of the at least one occupancy sensor is based on the at least one occupancy sensor's sensitivity to motion of said window treatment system.

5. The system of claim 1, wherein the time-out time for said at least one occupancy sensor is shorter when said at least one occupancy sensor is sensitive to motion of said window treatment system.

6. A method using the system for management of a response to motion detection and the window treatment system of claim 1, the method comprising the steps of:
    determining the schedule including times for adapting the window treatment state, wherein the adaptation interval time between sequential times in the schedule is greater than the time-out time of the at least one occupancy sensor, determining the window treatment state for the corresponding time in the schedule, receiving the occupancy signal from the at least one occupancy sensor to use in determining occupancy within the area, and adapting the window treatment state to the determined window treatment state only if the occupancy signal indicates that the area is occupied.

7. The method of claim 6, wherein the position of the window treatment system is based on a geographic location, a geographic orientation of the window treatment system, a time of day, day of the year, geometric properties of the window treatment system and geometric properties of a space.

8. The method of claim 6, wherein the orientation of the window treatment is further based on a geographic location, a geographic orientation of the window treatment system, a time of day, day of the year, geometric properties of the window treatment system and geometric properties of a space.

9. The method of claim 6, further comprising:

controlling at least one of: the position or the orientation of the window treatment system when motion is detected by the at least one occupancy sensor.

10. The method of claim 6, wherein the time-out time of the occupancy sensor is determined based on the occupancy sensor's sensitivity to motion of said window treatment system.

11. The method of claim 10, wherein the time-out time of the at least one occupancy sensor is shorter when said at least one occupancy sensor is sensitive to motion of said window treatment system.

12. The system of claim 1, wherein the memory includes code which when accessed by the processor causes the processor to determine a corresponding window treatment state for each time in the schedule, and at each of the times in the schedule:

receive an occupancy signal from the at least one occupancy sensor to use in determining occupancy within the enclosed area; and adapt the window treatment state to the determined window treatment state only if the occupancy signal indicates that the enclosed area is occupied.

* * * * *